(12) United States Patent
Guo

(10) Patent No.: US 11,899,508 B2
(45) Date of Patent: Feb. 13, 2024

(54) CAMERA AND TERMINAL DEVICE

(71) Applicant: Beijing Xiaomi Mobile Software Co., Ltd., Beijing (CN)

(72) Inventor: Yiwei Guo, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 587 days.

(21) Appl. No.: 17/001,105

(22) Filed: Aug. 24, 2020

(65) Prior Publication Data

US 2021/0318729 A1    Oct. 14, 2021

(30) Foreign Application Priority Data

Apr. 14, 2020   (CN) .......................... 202010291931.7

(51) Int. Cl.
| | |
|---|---|
| G06F 1/16 | (2006.01) |
| G02B 5/00 | (2006.01) |
| H04M 1/02 | (2006.01) |
| H04N 23/55 | (2023.01) |
| H04N 23/57 | (2023.01) |

(52) U.S. Cl.
CPC ........... *G06F 1/1686* (2013.01); *G02B 5/003* (2013.01); *H04M 1/0264* (2013.01); *H04N 23/55* (2023.01); *H04N 23/57* (2023.01)

(58) Field of Classification Search
CPC ...................................................... H05K 5/00
See application file for complete search history.

(56) References Cited

U.S. PATENT DOCUMENTS

| 8,506,183 B2 * | 8/2013 | Chang ................. G03B 11/045 |
| | | 396/534 |
| 9,807,312 B1 | 10/2017 | Kim et al. |
| 2010/0322608 A1 | 12/2010 | Nomura |

(Continued)

FOREIGN PATENT DOCUMENTS

| CN | 108873232 A | 11/2018 |
| CN | 209103079 U | 7/2019 |

(Continued)

OTHER PUBLICATIONS

Extended European Search Report dated Mar. 12, 2021 in European Patent Application No. 20200220.0, 10 pages.

(Continued)

*Primary Examiner* — Jerry Wu
(74) *Attorney, Agent, or Firm* — Oblon, McClelland, Maier & Neustadt, L.L.P.

(57) ABSTRACT

The present disclosure relates to a camera and a terminal device. The camera can include a lens module that can be configured to move along its axis. The camera can further include an optical element, and the lens module moves toward or away from the optical element along its axis to adjust a distance between the optical element and the lens module. The camera can also include a light shielding component and a connecting structure, and the lens module is connected to the light shielding component through the connecting structure, the lens module moves along its axis, and drives the light shielding component to move through the connecting structure, to adjust a size of an opening of the light shielding component.

14 Claims, 5 Drawing Sheets

(56) References Cited

U.S. PATENT DOCUMENTS

| | | | |
|---|---|---|---|
| 2011/0158621 A1* | 6/2011 | Honsho | G03B 17/12 |
| | | | 396/55 |
| 2013/0050534 A1 | 2/2013 | Kudoh | |
| 2015/0153539 A1 | 6/2015 | Yoo et al. | |
| 2016/0044232 A1 | 2/2016 | Kim et al. | |
| 2017/0150023 A1 | 5/2017 | Kim et al. | |
| 2019/0227199 A1 | 7/2019 | Kao et al. | |
| 2019/0227200 A1 | 7/2019 | Kao et al. | |
| 2019/0227201 A1 | 7/2019 | Kao et al. | |
| 2019/0227253 A1 | 7/2019 | Fan et al. | |
| 2019/0227256 A1 | 7/2019 | Kuo et al. | |
| 2019/0227257 A1 | 7/2019 | Song | |
| 2019/0227258 A1 | 7/2019 | Kao et al. | |
| 2019/0227259 A1 | 7/2019 | Hsu et al. | |
| 2019/0227300 A1 | 7/2019 | Tsai et al. | |
| 2019/0227330 A1 | 7/2019 | Hu et al. | |
| 2019/0227337 A1 | 7/2019 | Kuo et al. | |
| 2019/0227405 A1 | 7/2019 | Song et al. | |
| 2019/0227406 A1 | 7/2019 | Wang et al. | |
| 2019/0227408 A1 | 7/2019 | Fan et al. | |
| 2019/0228562 A1 | 7/2019 | Song et al. | |
| 2019/0230255 A1 | 7/2019 | Fu et al. | |
| 2019/0230256 A1 | 7/2019 | Kao et al. | |
| 2019/0230257 A1 | 7/2019 | Hu et al. | |
| 2019/0230261 A1 | 7/2019 | Hu et al. | |
| 2019/0230262 A1 | 7/2019 | Wang et al. | |
| 2019/0258136 A1 | 8/2019 | Yu et al. | |

FOREIGN PATENT DOCUMENTS

| | | | | |
|---|---|---|---|---|
| CN | 110082882 A | | 8/2019 | |
| CN | 110967783 A | | 4/2020 | |
| CN | 112822347 A | * | 5/2021 | .......... H04M 1/0264 |
| EP | 3 242 469 A1 | | 11/2017 | |
| JP | 2002-350718 A | | 12/2002 | |
| JP | 2004-109514 A | | 4/2004 | |
| JP | 2009-116174 A | | 5/2009 | |
| JP | 2010-14786 A | | 1/2010 | |
| WO | WO 2019/225980 A1 | | 11/2019 | |

OTHER PUBLICATIONS

Combined Chinese Office Action and Search Report dated Nov. 3, 2022, in corresponding Chinese Patent Application No. 202010291931.7 (with English Translation of Category of Cited Documents), 9 pages.

Combined Chinese Notice of Allowance and Search Report dated May 18, 2023, in corresponding Chinese Patent Application No. 202010291931.7 (with English Translation of Category of Cited Documents), 4 pages.

* cited by examiner

US 11,899,508 B2

CAMERA AND TERMINAL DEVICE

RELATED APPLICATION

The present application is based on and claims the priority to the Chinese Patent Application No. 202010291931.7, filed on Apr. 14, 2020, the entire contents of which are hereby incorporated by reference.

TECHNICAL FIELD

The present disclosure relates to the technical field of optical elements, and in particular to a camera and a terminal device.

BACKGROUND

With advancement of society and development of technology, mobile phones and other terminal devices continue to introduce new ones. Many mobile phone manufacturers pay more and more attention to shooting quality of camera lenses, and meet users' needs for shooting quality through focusing, anti-shake or large aperture.

Optical zoom is a common zoom manner in SLR cameras. The lens is moved to zoom in or out of the scene that needs to be captured. The greater the optical zoom factor, the farther the scene can be captured. When an angle of view and a focal length change, the remote scene becomes clearer. Although the SLR cameras have good optical zoom functions, they are large in size and complex in structure, and can further be unsuitable to carry. Therefore, integrating the optical zoom function with the camera lenses of mobile phones and other terminal devices to make the camera lenses of mobile phones and other terminal devices have the optical zoom function can be desirable.

In addition, when a scene is shot, a certain degree of exposure is required. The aperture is an apparatus used to adjust an amount of light entering the lens, and then adjust the exposure during shooting to obtain a clearer picture quality. As for miniaturized shooting devices such as mobile phones, there can be a difficultly in that the aperture size of the shooting lens cannot be adjusted, which causes that terminal devices such as mobile phones to be unable to adapt to various shooting environments, and thus affecting the quality of the shooting pictures.

SUMMARY

Aspects of the disclosure can provide a camera and a terminal device. According to a first aspect of the present disclosure, there is provided a camera that can be applied to a terminal device. The camera can include a lens module that is configured to move along its axis. The camera can further include an optical element, and the lens module moves toward or away from the optical element along its axis to adjust a distance between the optical element and the lens module. Additionally, the camera can include a light shielding component and a connecting structure, and the lens module is connected to the light shielding component through the connecting structure, the lens module moves along its axis, and drives the light shielding component to move through the connecting structure, to adjust a size of an opening of the light shielding component.

According to a second aspect of the present disclosure, there is provided a terminal device, wherein the terminal device includes the camera described above.

It should be noted that the above general description and the following detailed description are merely exemplary and explanatory, and should not be construed as limiting of the present disclosure.

BRIEF DESCRIPTION OF THE DRAWINGS

The drawings herein are incorporated into and constitute a part of this specification, show exemplary embodiments consistent with this disclosure, and are used together with the specification to explain the principles of this disclosure.

DETAILED DESCRIPTION

Figure 1:
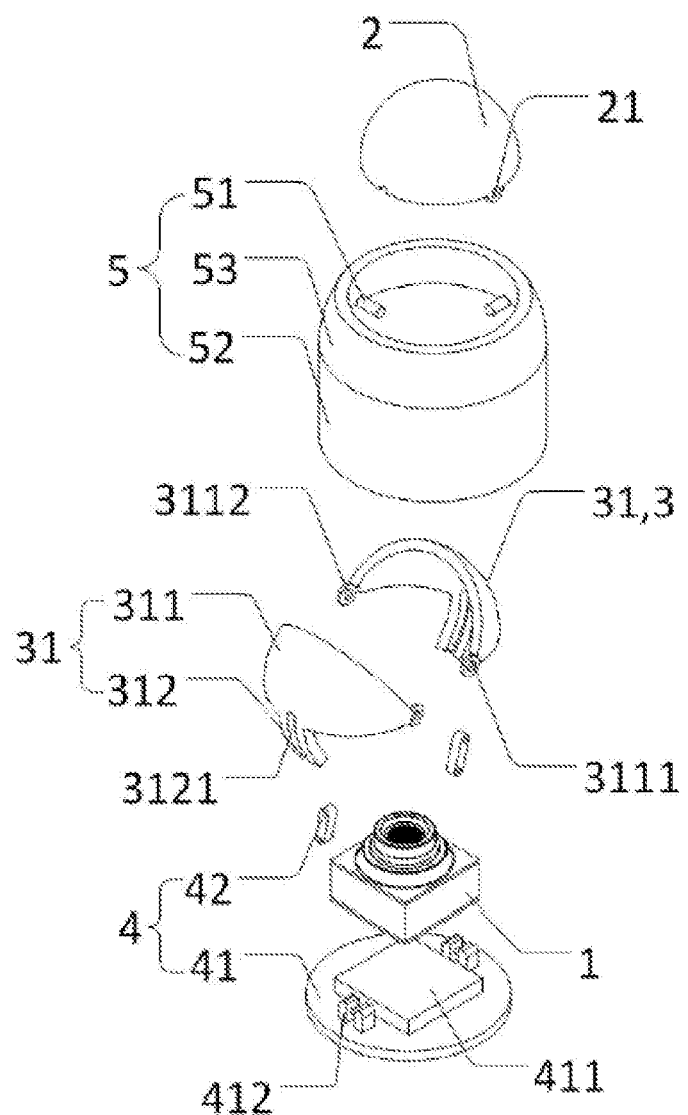
FIG. 1 is an exploded view of a camera according to an exemplary embodiment.

Exemplary embodiments will be described in detail herein, examples of which are shown in the drawings. When referring to the drawings below, unless otherwise indicated, the same numerals in different drawings represent the same or similar elements. The implementations described in the following exemplary embodiments do not represent all implementations consistent with the present disclosure. Rather, they are merely examples of apparatuses and methods consistent with some aspects of the present disclosure as detailed in the appended claims.

In related technologies, a zoom effect is generated by adjusting positions of a lens, an object, and a focal point. When shooting is performed, when an imaging surface moves along an axis of the lens, an angle of view and a focal length change, which can make farther scenes clear. That is, by changing the focal length of the lens to change the angle of view of shooting, the object is "zoomed in" or "zoomed out" to achieve optical zoom. Many mobile phones and other terminal devices produced by manufacturers often use telephoto and fixed focus to achieve the zoom function. The zoom capability can reach up to about 10 times. A larger zoom factor will affect the quality of the shooting picture and affect the user experience.

In related technologies, terminal devices, such as mobile phones, are limited by their own structure. The apertures built into terminal devices, such as mobile phones, are all fixed apertures, which not only have complex structures and high manufacturing costs, but also cannot change the size of the aperture and cannot adjust the amount of entering light, and then cannot meet requirements of various shooting environments, the user experience is poor. For example, due to excessive exposure under strong light, the captured picture will be too bright and white. For another example, due to underexposure under weak light, the captured picture has problems of dim, high noise and serious loss of detail.

The present disclosure proposes a camera and a terminal device. The camera is applied to a terminal device. The terminal device may be a portable electronic device, such as a mobile phone and a tablet computer. The camera includes a lens module, and the lens module is configured to move along its axis. The camera further includes optical elements. The lens module moves toward or away from the optical element along its axis to adjust the distance between the optical element and the lens module, to achieve the optical zoom function of the camera and to meet requirements of users to shoot objects at further distance and obtain high-definition picture quality. The camera includes a light shielding component and a connecting structure. The lens module is connected with the light shielding component through the connecting structure. The lens module moves along its axis and drives the light shielding component to move through the connecting structure, the size of the opening of the light shielding component is adjusted, and then the amount of light entering the lens module is adjusted, to meet requirements for the amount of entering light in different shooting scenes, and further improve the quality of the captured pictures.

Figure 2:
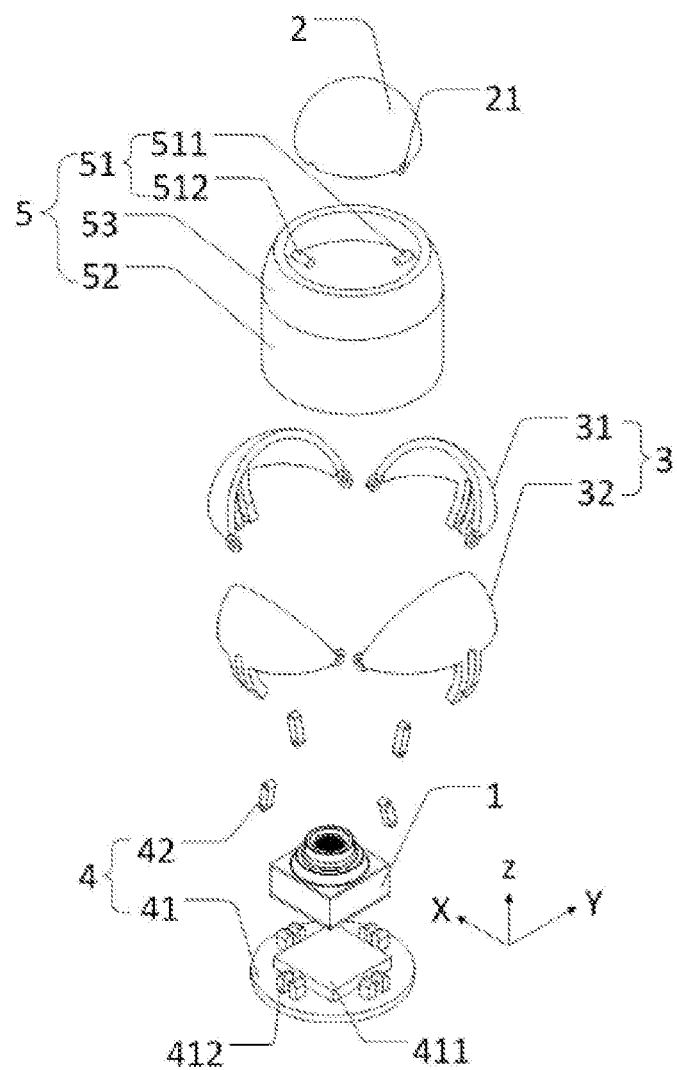
FIG. 2 is an exploded view of a camera according to another exemplary embodiment.
Figure 4:
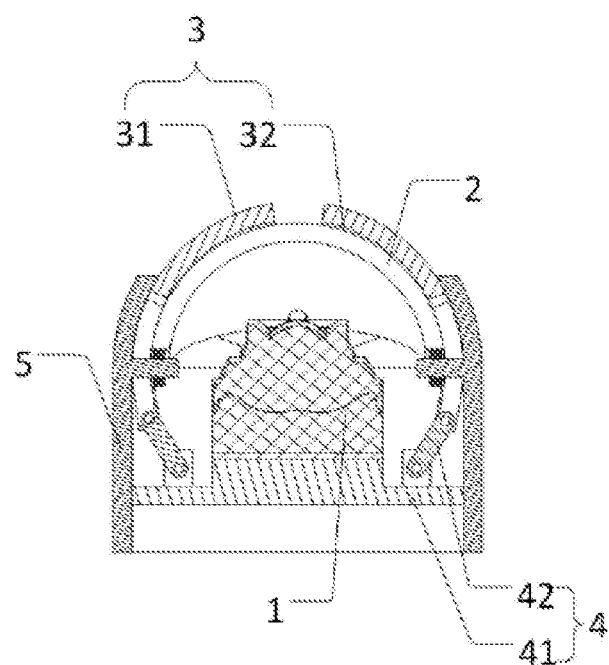
FIG. 4 is a schematic longitudinal cross-sectional view of a lens module of a camera moving to close to a second limiting position according to an exemplary embodiment.

As shown in FIG. 1, in an exemplary embodiment, a camera is provided, including a lens module 1, which can move along its axis (as shown in FIG. 2, the Z axis direction) under action of an external force. For example, the external force may be a linear motor. The linear motor may be arranged in the terminal device. A shaft end of the linear motor is fixedly connected with the lens module 1, and drives the lens module 1 to move along its axis. The terminal device supplies power to the linear motor, to drive the linear motor to operate, and then drive the lens module to move linearly. The camera further includes an optical element 2. The optical element 2 may be a hemispherical lens group or a single hemispherical lens. The camera includes a housing 5 on which the optical element 2 is fixedly arranged. Referring to FIG. 4, the lens module 1 is arranged inside the housing 5. The lens module 1 moves toward or away from the optical element 2 along its axis (as shown in FIG. 2, the Z axis direction) under action of the external force, and adjusts the distance between the optical element 2 and the lens module 1 to change the shooting angle of view. In other words, by zooming in or out of the captured subject, the angle of view and focal length are changed, to realize the optical zoom function of the camera, so that the scene in the distance becomes clearer.

As shown in FIG. 1, in another exemplary embodiment, the camera can include a lens module 1. The lens module 1 can move along its axis (as shown in FIG. 2, the Z axis direction) under action of the external force. The external force can be, for example, a micro-cylinder, which is directly or indirectly connected with the lens module 1 to drive the lens module 1 to move linearly along its axis. The camera further includes a light shielding component 3 and a connecting structure 4. The lens module 1 is connected with the light shielding component 3 through the connecting structure 4, and the lens module 1 moves along its axis (as shown in FIG. 2, the Z axis direction) and drives the light shielding component 3 to move through the connecting structure 4, to adjust a size of an opening of the light shielding component 3. When the opening size of the light shielding component 3 is large, the amount of light entering the lens module 1 is large. When the opening size of the light shielding component 3 is small, the amount of light entering the lens module 1 is small.

In this embodiment, structures of the connecting structure 4 and the light shielding component 3 are not limited, as long as the connecting structure 4 can convert the linear motion of the lens module 1 into opening and closing movements of the light shielding component 3. For example, in an example (not shown in the figure), the light shielding component may be a light shielding plate connected by a plurality of flat plates and arranged on a direction of light entering the lens module 1. Each flat plate can be retractable. The lens module 1 moves along its axis to drive the multiple flat plates to expand and contract to shield the lens assembly 1, or to form an opening in the middle of the light shielding plate. In this embodiment, the amount of light entering the lens module 1 is adjusted by adjusting the size of the opening of the light shielding component 3. Since the lens module 1 can move linearly under action of the external force, the amount of light entering the lens module 1 can be continuously adjusted. The user can determine the amount of entering light voluntarily according to the shooting requirements, to meet requirements for the amount of entering light in different shooting scenarios, improve the shooting quality, and enhance the user's shooting experience.

As shown in FIG. 2, in another exemplary embodiment, the camera includes a housing 5 and a lens module 1. The lens module 1 is disposed inside the housing 5, and the lens module 1 is configured to be able to move along its own axis (as shown in FIG. 2, the Z axis direction) relative to the housing 5. The camera further includes an optical element 2, a light shielding component 3, and a connecting structure 4. The optical element 2 is fixedly arranged inside the housing 5. The lens module 1 moves toward or away from the optical element 2 along its axis to adjust the distance between the optical element 2 and the lens module 1, to realize optical zoom, so that the user can still shoot clear images when shooting long-distance images. The lens module 1 is connected to the light shielding component 3 through the connecting structure 4, and the lens module 1 moves along its axis (as shown in FIG. 2, the Z axis direction), the light shielding component 3 is driven to move through the connecting structure 4, to adjust the opening size of the light shielding component 3, to meet requirements on the amount of light entering the lens module 1 in various shooting environments.

In this embodiment, when the lens module 1 is driven by an external force to move toward or away from the optical element 2 along its axis, the light shielding component 3 is driven to move through the connecting structure 4, to adjust the amount of light entering the lens module 1. Under driving of the external force, the lens module 1 and the light shielding component 3 move synchronously, which not only realizes the function of optical zoom, but also realizes the adjustment of the amount of light. At the same time, it realizes the optical zoom and aperture adjustment, meets the user's shooting requirements, has extremely high promotion values.

As shown in FIG. 1, in another exemplary embodiment, the light shielding component 3 includes at least one layer of light shielding structure. Each layer of the light shielding structure includes at least one light shielding part, and the at least one light shielding part forms a light shielding structure. For example, a hemispherical light shielding part forms a light shielding structure. When the lens module 1 moves along its axis, the hemispherical light shielding part is driven to rotate relative to the optical element 2, to adjust the amount of light incident into the lens module 1. For another example, a plurality of first light shielding parts 31 is connected to form a first light shielding structure, and a plurality of second light shielding parts 32 is connected to form a second light shielding structure. Each light shielding part is connected with the lens module 1 through the connecting structure 4, and the lens module 1 moves along the axis and drives each light shielding structure to move through the connecting structure 4, to adjust the size of the opening at the connection of the plurality of light shielding parts.

In this embodiment, the light shielding component 3 may include a layer of light shielding structure, that is, a first light shielding structure. The first light shielding structure includes two first light shielding parts 31, and the two first light shielding parts 31 are connected to form a hemispherical first light shielding structure. The lens module 1 moves along the axis (as shown in FIG. 2, the Z axis direction) and drives the two first light shielding parts 31 to move through the connecting structure 4 connected with the lens module 1, to adjust the size of the opening at the connection of the two light shielding parts 31 and change the amount of light entering the lens module 1, to meet various shooting situations. Of course, it can be understood that the number of the first light shielding parts 31 can also be three or four. The three or four first light shielding parts 31 are connected together to form a hemispherical first light shielding structure. Each first light shielding part 31 is connected with the connecting structure 4. When the lens module 1 moves along its axis toward a side away from the first light shielding structure, the first light shielding part 31 moves relative to the housing 5 to form an opening at a center of the first light shielding structure.

Figure 7:
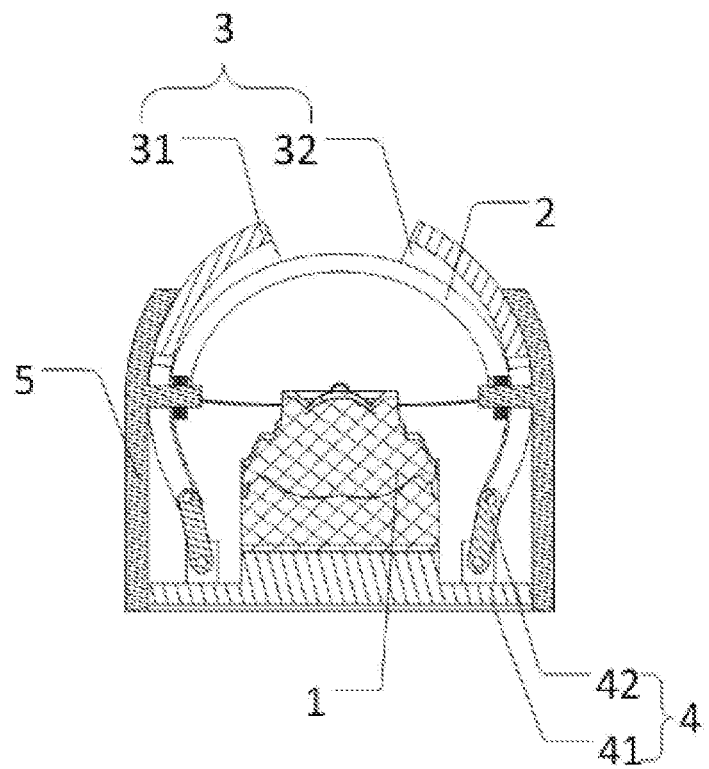
FIG. 7 is a schematic longitudinal cross-sectional view of a lens module of a camera moving to a first limiting position according to an exemplary embodiment.

As shown in FIG. 2, in another exemplary embodiment, in order to further improve accuracy of adjusting the amount of light entering the lens module 1, the light shielding component 3 includes a first light shielding structure and a second light shielding structure, the first light shielding structure includes two first light shielding parts 31, the two first light shielding parts 31 are connected to form a hemispherical first light shielding structure; the second light shielding structure includes two second light shielding parts 32, the two second light shielding parts 32 are connected to form a hemispherical second light shielding structure 2. As shown in FIG. 7, along the axis of the lens module 1 (as shown in FIG. 2, the Z axis direction), the first light shielding structure and the second light shielding structure are stacked.

Both the first light shielding structure and the second light shielding structure are arranged on a side of the optical element 2 away from the lens module 1, the second light shielding structure is close to the optical element 2, and the first light shielding structure is away from the optical element 2. The first light shielding structure and the second light shielding structure are respectively connected with the lens module 1 through the connecting structure 4. When the lens module 1 moves along its axis, the first light shielding structure and the second light shielding structure are linked. That is, when the lens module 1 moves along its axis toward a side away from the optical element 2, the first light shielding structure and the second light shielding structure are opened simultaneously. When the lens module 1 moves along its axis toward a side close to the optical element 2, the first light shielding structure and the second light shielding structure are closed simultaneously. By stacking the first light shielding structure and the second light shielding structure, space is effectively used, and the amount of light entering the lens module 1 is jointly adjusted. The adjustment of amount of entering light is more accurate and the problem of overexposure is avoided.

Figure 3:
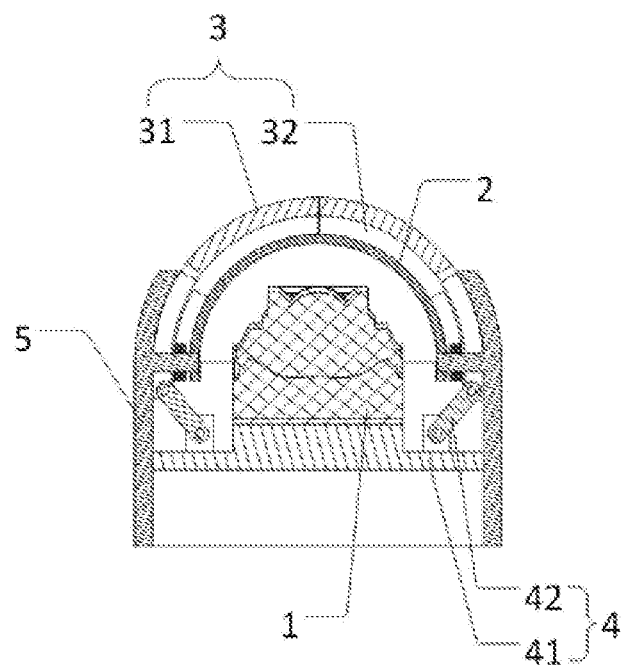
FIG. 3 is a schematic longitudinal cross-sectional view of a lens module of a camera moving to a second limiting position according to an exemplary embodiment.
Figure 5:
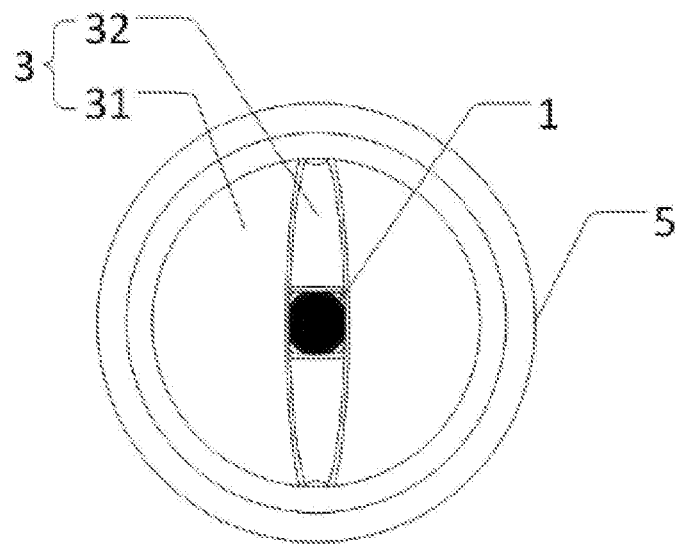
FIG. 5 is a top view of the camera shown in the embodiment shown in FIG. 4.

In this embodiment, referring to FIGS. 2, 3 and 7, the first light shielding structure includes two first light shielding parts 31, the second light shielding structure includes two second light shielding parts 32. The lens module 1 moves along its axis (as shown in FIG. 2, the Z axis direction), to adjust the opening size of the two first light shielding parts 31 in a first preset direction (as shown in FIG. 2, the Y-axis direction), and adjust the opening size of the two second light shielding parts 32 in a second preset direction (as shown in FIG. 2, the X axis direction). The first preset direction (X axis direction) and the second preset direction (Y axis direction) are perpendicular to each other. When the lens module 1 moves in a direction away from the optical element 2, along the direction of light entering the lens module 1, the first light shielding structure and the second light shielding structure cooperate to form an eyeball structure, to form a rectangular aperture, as shown in FIG. 5, to limit the amount of entering light in the first preset direction and the second preset direction simultaneously. It should be noted that, the limited amount of entering light in the first preset direction and the second preset direction may be the same or different. The actual amount of entering light in the first preset direction and the second preset direction is also affected by the environment. The incident angles of light at the rectangular aperture will also affect the amount of entering light in the first preset direction and the second preset direction. Therefore, the amount of entering light in the first preset direction and the second preset direction is subject to the actual shooting environment.

Of course, it can be understood that the first preset direction and the second preset direction are not limited to being perpendicular to each other. The first preset direction and the second preset direction can also be set at an angle. For example (not shown in the figure), the light shielding component 3 includes four layers of light shielding structures, each layer of the light shielding structure includes two light shielding parts, and the lens module 1 moves along its axis to adjust the opening sizes of the two light shielding parts on each layer of the light shielding structure in different preset directions. Every two adjacent preset directions can be set at 45°. When the lens module 1 moves in the direction away from the optical element 2, along the direction of light entering the lens module 1, the four layers of light shielding structure cooperates to form the eyeball structure, to form a polygonal aperture to further improve the accuracy of adjusting the entering light.

Herein, it should be noted that the above-mentioned limitations on the number of layers of light shielding structures and the number of light shielding parts are merely illustrative and do not limit the application. The light shielding structure may be one layer, two layers, or even more layers. The number of light shielding parts may be two, four, or even more. The specific number of layers of light shielding structures and the number of light shielding parts are subject to actual effective design space. If there are more layers of light shielding structures and the angle of adjacent preset directions is smaller, the opening formed by the light shielding structure will be closer to a circular hole, and the accuracy of adjusting entering light will be higher, the amount of light entering the lens module 1 from various angles will be more balanced, and the quality of the captured image will more meet requirements of users.

As shown in FIGS. 1 and 2, in another exemplary embodiment, this embodiment includes the aforementioned lens module 1, optical element 2, light shielding component 3 and other structures. The connecting structure 4 in this embodiment includes a link mechanism. The link mechanism is rotatably connected with the light shielding part of the light shielding component 3. The link mechanism is configured to rotate relative to the lens module 1. The lens module 1 moves along its axis (as shown in FIG. 2, the Z axis direction) and drives the plurality of light shielding parts to be separated from or connected with each other through movement of the link mechanism, to adjust a size of an opening at connection of the plurality of light shielding parts, and then adjust the amount of light entering the lens module 1.

In this embodiment, the connecting structure 4 further includes a fixing part 41. The fixing part 41 is installed in the housing 5. The fixing part 41 is fixedly connected with the lens module 1. The middle of the fixing part 41 is provided with a boss 411. The boss 411 is used to install the lens module 1, to make the connection between the lens module 1 and the fixing part 41 more stable. The link mechanism includes a connecting rod 42. A first end of the connecting rod 42 is rotatably connected with the fixing part 41. During the connection, a plurality of connecting lugs 412 may be provided on an end surface of the fixing part 41 close to the lens module 1. A first end of the connecting rod 42 is rotatably connected with the connecting lug 412 on the fixing part 41 through, for example, a pin shaft. A second end of the connecting rod 42 is also rotatably connected with the light shielding part by, for example, a pin shaft.

When the external force acts on the fixing part 41 and drives the lens module 1 to move along its own axis, the first end of the connecting rod 42 rotates relative to the fixing part 41, and the second end of the connecting rod 42 rotates relative to the light shielding part, to drive the light shielding part to move, thus realizing the connection or separation of the plurality of light shielding parts. The connecting structure in this embodiment uses the connecting rod 42. Of course, it is understandable that the connecting structure 4 may also be a connecting rod group composed of a plurality of rods. For example, the plurality of rods may be connected in sequence, and each adjacent two rods are rotatably connected. Two rods at the ends are rotatably connected with the lens module 1 and the light shielding component 3 respectively. The specific structure of the connecting rod group is not limited herein, as long as the linear motion of the lens module 1 may be converted into a connecting motion or a separating motion of the light shielding part.

Still referring to FIG. 2, in this embodiment, two light shielding parts are connected to form a light shielding structure. For example, two first light shielding parts 31 are connected to form a hemispherical first light shielding structure. The first light shielding part 31 includes a light shielding body 311 and a light-shielding limiting part 312 formed by a part of the light shielding body 311 extending along a curved direction of the light shielding body 311. An end of the light-shielding limiting part 312 away from the light shielding body 311 is rotatably connected with the second end of the connecting rod 42 through a connector such as a pin shaft. The light-shielding limiting part 312 may be disposed in the middle of the light shielding body 311, and the middle of the light shielding body 311 is located along the symmetric center axis.

As shown in FIGS. 1 and 2, in another exemplary embodiment, the camera further includes a housing 5. The lens module 1, the optical element 2, the connecting structure 4, the light shielding component 3 or the like are all mounted on the housing 5. The camera can be installed on terminal devices such as mobile phones through the housing 5. The housing 5 includes a cylindrical structure 52 and a hollow truncated cone structure 53. The cylindrical structure 52 can be installed on the terminal device. An outer diameter of the cylindrical structure 52 is the same as a diameter of a lower mesa of the hollow truncated cone structure 53. The cylindrical structure 52 and the hollow truncated cone structure 53 are an integral structure. Along the axial direction of the housing 5, the light shielding component 3, the optical element 2, the lens module 1 and the fixing part 41 are sequentially arranged inside the housing 5. The fixing part 41 is installed in the cylindrical structure 52, and the fixing part 41 may drive the lens module 1 to move along its axis in the cylindrical structure 52 under action of the external force.

The optical element 2 and the light shielding component 3 are installed inside the hollow truncated cone structure 53, the optical element 2 and the upper part of the light shielding component 3 protrude from the upper mesa of the hollow truncated cone structure 53, the optical element 2 and the lower part of the light shielding component 3 are arranged inside the hollow truncated cone structure 53. In this embodiment, the optical element 2 has a hemispherical structure, the edge of the optical element 2 is provided with a connecting part 21. A cylindrical housing limiting part 51 is formed on an inner side wall of the housing 5 by extending to the inside of the cylindrical structure 52. The connecting part 21 on the optical element 2 may be, for example, fixing rings, which are uniformly arranged at an edge of the optical element 2, and a plurality of cylindrical housing limiting parts 51 is uniformly arranged on the housing 5, and the fixing ring on the optical element 2 corresponds to the housing limiting part 51 on the housing 5 one by one. During installation, the housing limiting part 51 is inserted into the fixing ring, and they form a fixed connection. The housing limiting part 51 may be provided at the junction of the cylindrical structure 52 and the hollow truncated cone structure 53. Of course, it can be understood that, depending on the structure of the terminal device, the housing limiting part 51 can also be provided at other positions on the inner side wall of the housing 51. The number of the connecting part 21 and the housing limiting part 51 can be 2, 4, 6 or the like, so as to form a reliable connection with the housing 5 in the entire circumferential direction of the optical element 2.

Still referring to FIGS. 1 and 2, the light shielding component in this embodiment includes a first light shielding structure and a second light shielding structure. The first light shielding structure includes two first light shielding parts 31, and the second light shielding structure includes two second light shielding parts 32. In order to improve the installation reliability, four housing limiting parts 51 are provided on an inner side wall of the housing 5 in this embodiment, and the four housing limiting parts 51 are uniformly arranged along the circumferential direction of the housing 5. Among the four housing limiting parts 51, two opposite first housing limiting parts 511 are used to install the first light shielding part 31, and the other two second housing limiting parts 512 are used to install the second light shielding part 32.

In order to prevent the second housing limiting part 512 from affecting the movement of the first light shielding part 31, the light-shielding limiting part 312 in this embodiment has a limiting groove 3121, and the second housing limiting part 512 extends into the limiting groove 3121, to prevent the second housing limiting part 512 from affecting the movement of the first light shielding part 31. Similarly, in order to prevent the first housing limiting part 511 from affecting the movement of the second light shielding part 32, the light-shielding limiting part on the second light shielding part 32 in this embodiment also has a limiting groove, and the first housing limiting part 511 extends into the limiting groove of the second light shielding part 32, which is not repeated herein.

Figure 6:
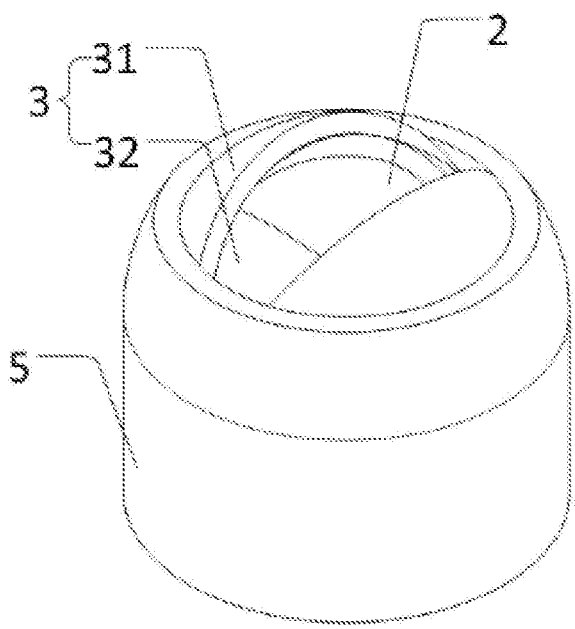
FIG. 6 is a schematic structural diagram showing a lens module of a camera moving to a first limiting position according to an exemplary embodiment.
Figure 8:
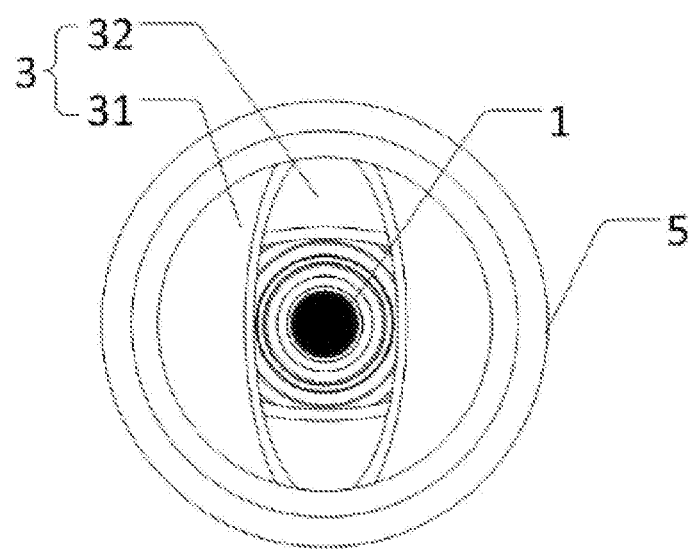
FIG. 8 is a top view of the camera shown in the embodiment shown in FIG. 7.

The setting of the limiting slot of the light shielding part also plays a limiting role. The lens module 1 moves along its axis. The second end of the connecting rod 42 and a notch end of the limiting slot 3121 form a rotational connection through a fixing member such as a pin shaft, and the limiting slot 3121 is driven by the connecting rod 42 to move relative to the housing limiting part 51. When the housing limiting part 51 abuts against the bottom wall of the limiting slot 3121, the lens module 1 moves to the first limiting position, as shown in FIGS. 6-8. At this time, the opening at the junction of the two first light shielding parts 31 is the largest, and the amount of light entering the lens module 1 is the largest. It is suitable for shooting at night or under environments of insufficient light, and increases the exposure at night or under insufficient light, reduces the noise in the dim picture, and avoids losing details of the captured picture. When the housing limiting part 51 abuts against the notch end of the limiting slot 3121, the lens module 1 moves to the second limiting position, as shown in FIG. 3.

At this time, the opening at the junction of the two first light shielding parts 31 is the smallest, and the opening is tends to be closed. When no shooting is performed, the first light shielding part 31 can also protect the optical element 2, to avoid friction between the optical element 2 and foreign objects, and avoid generating scratches on the surface of the optical element 2 and affecting the shooting quality. The user can adjust the position of the lens module 1 relative to the optical element 2 according to light conditions of the shooting environment. When the lens module 1 moves closer to the second limiting position, as shown in FIGS. 5 and 6, the amount of entering light at this time is the most suitable for outdoor environments with strong sunlight or strong light, which reduces the exposure during shooting, avoids the captured pictures too bright and white due to excessive exposure, and improves the shooting quality.

In another exemplary embodiment, still referring to FIG. 1, in order to effectively use the installation space and improve the installation reliability, the light shielding component 3 is reliably installed inside the housing 5. The light shielding body 311 further includes a mounting part, which can be an "O"-shaped structure. The mounting part includes a first mounting ring 3111 and a second mounting ring 3112. The first mounting ring 3111 and the second mounting ring 3112 are symmetrically arranged at the edge of the light shielding body 311. The housing limiting part 51 is a round rod structure extending into the housing 5. The first mounting rings 3111 on the two first light shielding parts 31 are correspondingly arranged and rotatably connected with the housing limiting part 51. The two first mounting rings 3111 on the same housing limiting part 51 are staggered and set side by side on the housing limiting part 51, and the second mounting rings 3112 on the two first light shielding parts 31 are arranged in the same way, which will not be repeated herein. The light shielding body 311 is installed in the hollow truncated cone structure 53 of the housing 5 through the first mounting ring 3111 and the second mounting ring 3112 on the mounting part. The upper portion of the light shielding body 311 protrudes from the upper mesa of the hollow truncated cone structure 53. The "O"-shaped structure of the mounting portion is only an exemplary description, and does not limit the application. The mounting portion can also be a "□"-shaped structure or an "Ω"-shaped structure, as long as the mounting portion and the housing limiting part 51 are rotatably connected.

The present disclosure proposes a terminal device including the above-mentioned camera. The terminal device may be an electronic device convenient for handheld shooting, such as a mobile phone, a tablet computer or the like.

In an exemplary embodiment (not shown in the figure), the camera is a component of the terminal device for realizing the shooting function. The camera is installed on the terminal device through the housing on the camera, and is electrically connected with the terminal device, for controlling the camera to shoot by operating the terminal device. The camera includes a lens module, an optical element, a light shielding structure, and a connecting structure. The lens module moves toward or away from the optical element along its axis, and adjusts the distance between the optical element and the lens module to achieve optical zoom for better shooting people or things in the distance. The lens module is connected with the light shielding component through a connecting structure. When the lens module moves along its axis toward or away from the optical element, the connecting structure drives the light shielding component to move, the size of the opening of the light shielding component is adjusted, and the amount of light entering the lens module is adjusted. In the implementation process, there are many ways to drive the lens module to move toward or away from the optical element. A driving element can be set to drive the lens module. For example, the driving element can be a linear motor, and the lens module can be driven by the linear motor to move linearly. The drive shaft of the linear motor is fixedly connected to the fixing part, and the fixing part is driven to move toward or away from the housing of the terminal device. The lens module arranged on the fixing part moves toward or away from the optical element, to adjust the distance between the lens module and the optical element, change the focal length of the camera to shoot the scene, so as to realize the optical zoom function.

In addition, when the fixing part moves toward or away from the housing of the terminal device, the light shielding component also follows its movement, the size of the opening of the light shielding component is adjusted and the amount of light entering the lens module is changed, which not only satisfies the optical zoom but also ensures the exposure of the shooting, and obtains pictures with higher quality. For another example, the driving element may also be a micro-cylinder. The micro-cylinder drives the lens module to move in a straight line, and the above functions can also be achieved, which will not be repeated herein. The driving element is electrically connected to the terminal device, the power supply part of the terminal device supplies power to the driving element, and the control part of the terminal device controls the operation of the driving element, which realizes the sense of technology of the terminal device and improves the user experience. In addition, the lens module moves in the housing of the camera, and the overall shape of the terminal device does not change, which improves the overall stability of the terminal device.

The technical solutions provided by embodiments of the present disclosure may include numerous beneficial effects. For example, by moving the lens module toward or away from the optical element along its axis, a distance between the optical element and the lens module is adjusted to realize an optical zoom function of the camera, and to obtain a clearer picture quality.

The light shielding component and the lens module are connected through a connecting structure, the lens module is moved along its axis, and the connecting structure drives the light shielding component to move, a size of an opening of the light shielding component is adjusted, and then an amount of light entering the lens module is adjusted to apply to various shooting situations and meet shooting requirements of the user.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative only, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A camera that is applied to a terminal device, the camera comprising: a lens module that is configured to move along an axis; an optical element that is coupled to the lens module so that the lens module is able to move towards or away from the optical element along the axis in order to adjust a distance between the optical element and the lens module; and a light shielding component that is coupled to the lens module through a connecting structure, the connecting structure driving the light shielding component to adjust a size of an opening of the light shielding component as the lens module moves along the axis; and the connecting structure further comprises a fixing part that is fixedly connected with the lens module, a first end of a connecting rod is rotatably connected with the fixing part and a second end of the connecting rod is rotatably connected with the light shielding part: wherein as the lens module moves along the axis, the connecting rod adjusts a distance of the light shielding part from the axis in a first direction and a distance of the light shielding part from the fixing part in a second direction perpendicular to the first direction.

2. The camera according to claim 1, the light shielding component including at least one layer of light shielding structure, with each layer of the light shielding structure having at least one light shielding part, wherein at least one of the light shielding parts forms the light shielding structure, and each of the light shielding parts is connected with the lens module through the connecting structure to drive each of the light shielding structures to move as the lens module moves along the axis.

3. The camera according to claim 2, wherein:
the light shielding component comprises a first light shielding structure and a second light shielding structure, the first light shielding structure includes a plurality of first light shielding parts that form a hemispherical first light shielding structure, the second light shielding structure including a plurality of second light shielding parts that form a hemispherical second light shielding structure; and
the first light shielding structure and the second light shielding structure are stacked along the axis of the lens module.

4. The camera according to claim 3, wherein:
the first light shielding structure includes two first light shielding parts and the second light shielding structure includes two second light shielding parts; and
the lens module moves along the axis to adjust sizes of openings of the two first light shielding parts in a first preset direction, and adjust sizes of openings of the two second light shielding parts in a second preset direction.

5. The camera of claim 4, wherein the first preset direction and the second preset direction are perpendicular to each other.

6. The camera according to claim 2, wherein:
the connecting structure includes a link mechanism that is rotatably connected with the light shielding part, and the link mechanism is configured to rotate relative to the lens module; and
the lens module moves along the axis and drives the light shielding parts to be separated from or connected with each other through movement of the link mechanism in order to adjust a size of an opening at connection of the light shielding parts.

7. The camera according to claim 6, wherein:
the light shielding part has an arc-shaped curved structure, the light shielding part includes a light shielding body and a light-shielding limiting part formed by a part of the light shielding body extending along a curved direction of the light shielding body; and
an end of the light-shielding limiting part that is located away from the light shielding body is rotatably connected with the second end of the connecting rod.

8. The camera according to claim 7, the camera further comprising a housing having a housing limiting part that is provided on an inner side wall of the housing, and the light-shielding limiting part has a limiting groove, the housing limiting part extends into the limiting groove;
wherein the lens module moves along the axis and drives the limiting groove to move relative to the housing limiting part through the connecting rod, and the lens module moves to a first limiting position when the housing limiting part abuts against a bottom wall of the limiting groove.

9. The camera according to claim 8, wherein the light shielding body comprises a mounting part that is rotatably connected with the housing limiting part, and the light shielding body is mounted on an inner side of the housing through the mounting part.

10. The camera according to claim 1, the camera further comprising a housing having a housing limiting part that is provided on an inner side wall of the housing, wherein the optical element is fixedly connected with the housing limiting part and installed on an inner side of the housing through the housing limiting part.

11. A terminal device having a camera comprising: a lens module that is configured to move along an axis; an optical element that is coupled to the lens module so that the lens module moves toward or away from the optical element along the axis to adjust a distance between the optical element and the lens module; and a light shielding component that is coupled to the lens module through a connecting structure, the connecting structure driving the light shielding component to adjust a size of an opening of the light shielding component as the lens module moves along the axis and the connecting structure further comprises a fixing part that is fixedly connected with the lens module, a first end of a connecting rod is rotatably connected with the fixing part and a second end of the connecting rod is rotatably connected with the light shielding part; wherein as the lens module moves along the axis, the connecting rod adjusts a distance of the light shielding part from the axis in a first direction and a distance of the light shielding part from the fixing part in a second direction perpendicular to the first direction.

12. The camera according to claim 3, wherein:
the connecting structure includes a link mechanism that is rotatably connected with the light shielding part, and the link mechanism is configured to rotate relative to the lens module; and
the lens module moves along the axis and drives the plurality of light shielding parts to be separated from or connected with each other through movement of the link mechanism in order to adjust a size of an opening at connection of the plurality of light shielding parts.

13. The camera according to claim 4, wherein:
the connecting structure includes a link mechanism that is rotatably connected with the light shielding part, and the link mechanism is configured to rotate relative to the lens module; and
the lens module moves along the axis and drives the plurality of light shielding parts to be separated from or connected with each other through movement of the link mechanism in order to adjust a size of an opening at connection of the plurality of light shielding parts.

14. The camera according to claim 5, wherein:
the connecting structure includes a link mechanism that is rotatably connected with the light shielding part, and the link mechanism is configured to rotate relative to the lens module; and
the lens module moves along the axis and drives the plurality of light shielding parts to be separated from or connected with each other through movement of the link mechanism in order to adjust a size of an opening at connection of the plurality of light shielding parts.

* * * * *